United States Patent
Minami et al.

(10) Patent No.: US 8,293,396 B2
(45) Date of Patent: Oct. 23, 2012

(54) NON-AQUEOUS ELECTROLYTE SECONDARY CELL

(75) Inventors: Keisuke Minami, Hyogo (JP); Toyoki Fujihara, Naruto (JP); Yasuhiro Yamauchi, Sumoto (JP); Toshiyuki Nohma, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/182,088

(22) Filed: Jul. 13, 2011

(65) Prior Publication Data

US 2012/0015238 A1   Jan. 19, 2012

(30) Foreign Application Priority Data

Jul. 16, 2010 (JP) ................... 2010-161471
Dec. 22, 2010 (JP) ................... 2010-286400

(51) Int. Cl.
*H01M 6/32* (2006.01)
(52) U.S. Cl. .......... 429/118; 429/50; 429/161; 429/188; 429/324
(58) Field of Classification Search .................... 429/50, 429/118.161, 188, 324
See application file for complete search history.

(56) References Cited

U.S. PATENT DOCUMENTS

| | | | |
|---|---|---|---|
| 540,127 A * | 5/1895 | Eizenhut et al. ............. | 472/20 |
| 5,340,670 A | 8/1994 | Takami et al. | |
| 2010/0086833 A1 * | 4/2010 | Pozin et al. ............. | 429/50 |
| 2010/0248026 A1 * | 9/2010 | Hinoki et al. ............. | 429/209 |

FOREIGN PATENT DOCUMENTS

| | | |
|---|---|---|
| JP | 60-65479 A | 4/1985 |
| JP | 06-275321 A | 9/1994 |
| JP | 08-111239 A | 4/1996 |
| JP | 11-135107 A | 5/1999 |
| JP | 2000-294294 A | 10/2000 |
| JP | 2002-33123 A | 1/2002 |
| JP | 2002-270225 A | 9/2002 |
| JP | 2007-220455 A | 8/2007 |
| JP | 2008-98107 A | 4/2008 |
| JP | 2010-113804 A | 5/2010 |

OTHER PUBLICATIONS

JP11-135107 A1 (machine translation).*
JP11-135107.TRANSProfessional.*

* cited by examiner

*Primary Examiner* — Patrick Ryan
*Assistant Examiner* — Alex Usyatinsky
(74) *Attorney, Agent, or Firm* — Westerman, Hattori, Daniels & Adrian, LLP

(57) ABSTRACT

The non-aqueous electrolyte secondary cell comprises a positive electrode having a positive electrode active material composed of a lithium transition metal composite oxide, a negative electrode having a negative electrode active material composed of carbon material, a non-aqueous electrolyte solution, and an outer body in which the positive electrode, the negative electrode and the non-aqueous electrolyte solution are housed; the mass of the non-aqueous electrolyte solution per cell capacity of the non-aqueous electrolyte secondary cell is 10.0 to 12.0 g/Ah; and the volume of the non-aqueous electrolyte solution per void volume in the outer body is 70 to 85%.

4 Claims, No Drawings

NON-AQUEOUS ELECTROLYTE SECONDARY CELL

FIELD OF THE INVENTION

The present invention relates to a non-aqueous electrolyte secondary cell, and more specifically to a non-aqueous electrolyte secondary cell having excellent cycle characteristics.

BACKGROUND ART

Portable electronic devices such as a camcorder, a mobile phone and a laptop computer have been rapidly improved in compactness and weight reduction. As a driving power source for these devices, non-aqueous electrolyte secondary cells, which have high energy density and high capacity, are widely used.

In recent years, non-aqueous electrolyte secondary cells have also been used as the driving power source of electric tools, electric vehicles, and the like. In such uses, excellent cycle characteristic is required over a wide temperature range from low to high temperature.

Techniques of such a non-aqueous electrolyte secondary cell are described in the patent documents 1 to 10.

[Patent Document 1]
Japanese Patent Application Publication No. H8-111239
[Patent Document 2]
Japanese Patent Application Publication No. 2002-270225
[Patent Document 3]
Japanese Patent Application Publication No. 2008-98107
[Patent Document 4]
Japanese Patent Application Publication No. 2002-33123
[Patent Document 5]
Japanese Patent Application Publication No. S60-65479
[Patent Document 6]
Japanese Patent Application Publication No. 2000-294294
[Patent Document 7]
Japanese Patent Application Publication No. 2010-113804
[Patent Document 8]
Japanese Patent Application Publication No. H11-135107
[Patent Document 9]
Japanese Patent Application Publication No. H6-275321
[Patent Document 10]
Japanese Patent Application Publication No. 2007-220455

Patent Document 1 discloses a technique in which the ratio of electrolyte amount and charge-discharge capacity is set to 0.0064 cc/mAh or more. The document states that this technique can provide a coin-type secondary cell that is capable of preventing the occurrence of defects unique to the thin shape of the cell.

Patent Document 2 discloses a technique in which, in a lithium secondary cell with a volumetric capacity density of 400 Wh/L or more, the total amount Q of an electrolyte solution in the cell is regulated as $(Vx+0.4 Vy) \leq Q \leq (Vx+0.8 Vy)$ wherein Vx denotes the total volume of voids in a polymer membrane and positive and negative electrodes, and Vy denotes the volume sum of a space between the electrodes and the polymer membrane, a space between an inner wall of a cell case and a side wall of the electrode plates consisting of the electrodes and the polymer membranes, and voids in the cell (top and bottom of the electrode plates). The document states that this technique can ensure high capacity and long-life characteristics.

Patent Document 3 discloses a technique in which the amount of organic solvents per Ah of cell capacity is 6 to 8 g/Ah, and the facing area between the negative electrode active material containing layer and the positive electrode active material containing layer per gram of the organic solvents is regulated to 130 to 290 $cm^2$/g. The document states that this technique can provide a non-aqueous electrolyte cell that excels in rapid charge performance.

Patent Document 4 discloses a technique in which the volume of electrolyte per unit cell discharge capacity (Ah) is 3 to 7 g, lithium tetrafluoro borate is used as a lithium salt, and the concentration of the lithium salt is set to 1.5 to 4 M. The document states that this technique can provide a film-packaged non-aqueous electrolyte cell having excellent safety without electrolyte leakage and cell swelling.

Patent Document 5 discloses a technique in which a value of an electrolyte amount divided by a positive electrode capacity is 3 μL/mAh or higher in a lithium secondary cell using a transition metal chalcogen compound as a positive electrode active material and using lithium or lithium alloy as a negative electrode active material. The document states that this technique can improve charge-discharge cycle characteristics.

Patent Document 6 discloses a technique in which, in a non-aqueous electrolyte secondary cell using lithium manganese oxide as a positive electrode active material, when the sum of the void volume, which is calculated from porosities of negative and positive electrodes and a separator, is defined as 1, the amount of a non-aqueous electrolyte solution is 0.8 to 1.5. The document states that this technique can improve cycle characteristics of the non-aqueous electrolyte secondary cell using lithium manganese oxide as a positive electrode active material under high temperature condition.

Patent Document 7 discloses a technique in which the amount (by volume) of a non-aqueous electrolyte solution is set to 0.9 times or higher and 1.6 times or lower of the total volume of voids in a separator and positive and negative electrodes. The document states that this technique can further suppress capacity decrease during repeated charge-discharge cycles.

Patent Document 8 discloses a technique in which, in a negative electrode using graphitic carbon as a negative electrode active material, the impregnation rate of an electrolyte solution is set to 70 to 90%. The document states that this technique can provide a lithium secondary cell having excellent cycle characteristics and less capacity deterioration involved in charge-discharge operations.

Patent Document 9 discloses a technique regarding a lithium secondary cell. The cell comprises: a positive electrode comprising, as a positive electrode active material, a lithium metal compound mainly containing at least one metal selected from cobalt, nickel, manganese, vanadium, titanium, and molybdenum or iron; carbon material that is powder having 0.340 nm or less of diffraction peak ($d_{002}$) of (002) plane in the graphite structure by X-ray diffraction; and a non-aqueous electrolyte solution. In this cell, the amount of the non-aqueous electrolyte is 7 $cm^3$/Ah relative to cell discharge capacity. The document states that this technique can provide a lithium secondary cell having high capacity and excellent cycle life.

Patent Document 10 discloses a technique in which, the amount of non-aqueous electrolyte solution is set to 1.3 to 1.8 μL per 1 mAh of discharge capacity. The document states that this technique can realize a non-aqueous electrolyte secondary cell having excellent reliability during high-temperature storage, without deteriorating cycle characteristics even when the cell capacity and energy density are high.

However, even with any of the above technologies, there is a problem that excellent cycle characteristic is not necessarily obtained over a wide temperature range from low to high temperature.

SUMMARY OF THE INVENTION

The present invention is completed in view of the above problems, and aims to provide a non-aqueous electrolyte secondary cell that exhibits excellent cycle characteristics over a wide temperature range from low to high temperature (e.g., −30 to 70° C.).

The invention for solving the above problems is configured as follows: a non-aqueous electrolyte secondary cell comprises a positive electrode having a positive electrode active material composed of a lithium transition metal composite oxide, a negative electrode having a negative electrode active material composed of carbon material, a non-aqueous electrolyte solution, and an outer body in which the positive electrode, the negative electrode and the non-aqueous electrolyte solution are housed; the mass of the non-aqueous electrolyte solution per cell capacity of the non-aqueous electrolyte secondary cell is 10.0 to 12.0 g/Ah; and the volume of the non-aqueous electrolyte solution per void volume in the outer body is 70 to 85%.

The present inventors have intensively studied to find that, in order to obtain excellent cycle characteristics over a wide temperature range from low to high temperature, it is required that the volume of the non-aqueous electrolyte solution per void volume in the outer body as well as the mass of the non-aqueous electrolyte solution per cell capacity lie within a predetermined range. This finding is explained below.

When the volume of the non-aqueous electrolyte solution per void volume in the outer body is too small, a sufficient amount of the non-aqueous electrolyte solution is not supplied during repeated charge and discharge cycles, and thus cycle characteristics is deteriorated due to shortage of the non-aqueous electrolyte solution. Moreover, when the mass of the non-aqueous electrolyte solution per cell capacity is too small, since the absolute amount of the non-aqueous electrolyte solution is small, shortage of the non-aqueous electrolyte solution is likely to occur also in this case. Shortage of the non-aqueous electrolyte solution is more likely to occur especially under a low temperature condition in which viscosity of non-aqueous electrolyte solution increases, and therefore the cycle characteristic under a low temperature condition is significantly deteriorated. For the above reasons, the mass of the non-aqueous electrolyte solution per cell capacity is set to 10 g/Ah or more, and the volume of the non-aqueous electrolyte solution per void volume in the outer body is set to 70% or more.

On the other hand, when the volume of the non-aqueous electrolyte solution per void volume in the outer body is too large, since a longer time is required for injection of the non-aqueous electrolyte solution, the production efficiency is reduced. In addition, when the mass of the non-aqueous electrolyte solution per cell capacity is around 12 g/Ah, the effect of improving cycle characteristics at a low temperature almost reaches the maximum. In this situation, if the mass of the non-aqueous electrolyte solution increases more than the above value, weight energy density decreases. For the above reasons, the mass of the non-aqueous electrolyte solution per cell capacity is limited to 12 g/Ah or less, and the volume of the non-aqueous electrolyte solution per void volume in the outer body is limited to 85% or less.

As used herein, the above-mentioned cell capacity means a discharge capacity (the initial capacity) during discharge at the constant current of 1 It to the voltage of 2.5 V after a cell is charged at the constant current of 1 It to the voltage of 4.1V and then at the constant voltage of 4.1 V for 2.5 hours. The above charge and discharge are all performed at 25° C. And the value of 1 It corresponds to an electric current value that allows a cell capacity to be discharged in one hour.

The void volume in the outer body can be calculated by subtracting the substantial volume of components (excluding the non-aqueous electrolyte solution) housed in a sealed space from the volume of the sealed space itself, which is formed by the outer body itself or the outer body and the sealing plate. The above components include an electrode assembly, an insulation plate for insulating the electrode assembly from the outer body or the sealing plate, leads for connecting the electrode assembly and the external terminal, and the like. Herein, the substantial volume of the components such as the electrode assembly does not include the void volume of the positive and negative electrodes and the separator. In addition, the void volume in the outer body is based on the condition at 25° C. and 1 atm (101325 Pa).

The volume of the non-aqueous electrolyte solution per void volume in the outer body is based on the condition at 25° C. and 1 atm (101325 Pa).

In the above configuration, a protective layer composed of an inorganic oxide and an insulative binder is respectively formed on at least one surface of the positive and negative electrodes. The inorganic oxide may be at least one selected from the group consisting of alumina, titania and zirconia.

Since the above protective layer is composed of an insulative inorganic oxide and an insulative binder, even if a conductive foreign material mixes in the cell and thereby a separator insulating the positive and negative electrodes is broken, the likelihood of preventing internal short circuit can be increased. Thus, the safety of the cell in an emergency is improved.

DETAILED DESCRIPTION OF THE INVENTION

The embodiments for carrying out the present invention will be described below in detail using Examples. It will be understood that the present invention will not be limited by the embodiments below; modifications are possible without departing from the scope of the present invention.

Example 1

Preparation of Positive Electrode Active Material

Lithium carbonate ($Li_2CO_3$) as a lithium source and $(Ni_{0.35}Co_{0.35}Mn_{0.3})_3O_4$ as a transition metal source were mixed so that the ratio of the mole number of lithium and the total mole number of the transition metals was 1:1. This mixture was calcined under an air atmosphere at 900° C. for 20 hours to prepare a positive electrode active material formed of $LiNi_{0.35}Co_{0.35}Mn_{0.3}O_2$.

Preparation of the Positive Electrode

The positive electrode active material, and flaked graphite and carbon black as a conductive agent were mixed with dispersion in which polyvinylidene fluoride as a binder was dispersed in N-methyl-2-pyrrolidone (NMP) in the solids mass ratio of 88:7:2:3 to prepare a positive electrode active material slurry. This positive electrode active material slurry was applied on both surfaces of a positive electrode core (15 μm thickness) made of aluminum alloy. However, the slurry was not applied on one end along the longitudinal direction of the positive electrode core (one end on the same side in both surfaces) in order to expose the core and form a positive electrode core exposed portion.

This plate was dried to evaporate and remove NMP that had been needed in the slurry preparation. Then, the plate was rolled so that the filling density was 2.61 g/cm$^3$, and then was cut to a predetermined size to prepare a positive electrode.

Preparation of the Negative Electrode

Natural graphite as a negative electrode active material, styrene butadiene rubber as a binder, and carboxymethyl cellulose as a thickening agent were mixed in the mass ratio of 98:1:1, and further mixed with water to prepare a negative electrode active material slurry. Thereafter, this negative electrode active material slurry was applied on both surfaces of a negative electrode core (10 µm thick) made of copper. However, the slurry was not applied on one end along the longitudinal direction of the negative electrode core (one end on the same side in both surfaces) in order to expose the core and form a negative electrode core exposed portion.

This plate was dried to evaporate and remove water that had been needed for the slurry preparation. Then, the plate was rolled so that the filling density was 1.11 g/cm$^3$, and then was cut to a predetermined size.

Thereafter, alumina, an acrylonitrile-based binder and NMP were mixed in the mass ratio of 30:0.9:69.1 to prepare a slurry, and this slurry was applied on the negative electrode active material layer. This electrode plate was dried to evaporate and remove NMP that had been needed for the slurry preparation, thus preparing a negative electrode forming a protective layer. The thickness of the protective layer was 3 µm.

Each filling density of the positive and negative electrodes was calculated as follows. First, the rolled electrode was cut into the size of 10 cm$^2$, and its mass A (g) and thickness C (cm) were measured. Then, the core was cut into the size of 10 cm$^2$, and its mass B (g) and thickness D (cm) were measured. The filling density was calculated using the following equation. The filling density of the negative electrode was measured prior to applying the alumina-containing slurry.

Filling density (g/cm$^3$)=$(A-B)/[(C-D)\times 10$ (cm$^2$)]

Preparation of the Electrode Assembly

The positive and negative electrode plates and a separator made of a polyethylene microporous film were laminated and positioned so that a plural of the exposed cores of the same electrode plate were directly overlapped, the exposed cores of the different electrode plate were protruded in opposite directions each other relative to the winding direction, and the separator was interposed between the respective active material layers. Then, this laminate was wound using a winder, and an insulation tape was sticked at the winding end. Thereafter, the wound assembly was pressed to complete a flat electrode assembly.

Attachment of the Current Collector Plate

Thereafter, a positive electrode current collector plate made of aluminum was attached to a positive electrode core collective area where a plural of the positive electrode core exposed portions were overlapped, while a negative electrode current collector plate made of copper was attached to a negative electrode core collective area where a plural of the negative electrode core exposed portions were overlapped. Each of the above attachments was performed using laser welding.

Preparation of the Non-Aqueous Electrolyte Solution

Ethylene carbonate (EC) and ethyl methyl carbonate (EMC) as non-aqueous solvents were mixed in the volume ratio of 3:7 (25° C., 1 atm), and then LiPF$_6$ as an electrolyte salt was dissolved therein so that the concentration was 1 M (mol/l) in order to prepare a base non-aqueous electrolyte solution. Then, this base non-aqueous electrolyte solution, vinylene carbonate and cyclohexylbenzene were mixed in the mass ratio of 97.7:0.3:2.0, and lithium bis(oxalate)borate was further dissolved therein so that the concentration was 0.12 M (mol/l) in order to prepare a non-aqueous electrolyte solution.

Cell Assembly

After the above electrode assembly, which was designed so that cell capacity was 5.4 Ah, was housed in a prismatic outer can, the positive and negative current collector plates were respectively connected to external electrode terminals provided on a sealing plate. Then, 55.08 g of the non-aqueous electrolyte solution was injected into the outer can, and the opening of the outer can was sealed to fabricate a non-aqueous electrolyte secondary cell according to Example 1.

Example 2

A non-aqueous electrolyte secondary cell according to Example 2 was fabricated in the similar manner to the above Example 1 except that 58.86 g of the non-aqueous electrolyte solution was injected.

Example 3

A non-aqueous electrolyte secondary cell according to Example 3 was fabricated in the similar manner to the above Example 1 except that 63.18 g of the non-aqueous electrolyte solution was injected.

Comparative Example 1

A non-aqueous electrolyte secondary cell according to Comparative Example 1 was fabricated in the similar manner to the above Example 1 except that 50.76 g of the non-aqueous electrolyte solution was injected.

Comparative Example 2

A non-aqueous electrolyte secondary cell according to Comparative Example 2 was fabricated in the similar manner to the above Example 1 except that the filling densities of the positive and negative electrodes were 2.43 g/cm$^3$ and 0.96 g/cm$^3$ respectively, and the positive and negative electrodes were cut out to prepare electrode assemblies so that the cell capacity was 4.6 Ah, and 46.92 g of the non-aqueous electrolyte solution was injected.

Comparative Example 3

A non-aqueous electrolyte secondary cell according to Comparative Example 3 was fabricated in the similar manner to the above Comparative Example 2 except that 50.14 g of the non-aqueous electrolyte solution was injected.

Comparative Example 4

A non-aqueous electrolyte secondary cell according to Comparative Example 4 was fabricated in the similar manner to the above Comparative Example 2 except that 53.36 g of the non-aqueous electrolyte solution was injected.

Comparative Example 5

A non-aqueous electrolyte secondary cell according to Comparative Example 5 was fabricated in the similar manner to the above Example 1 except that the filling densities of the positive and negative electrodes were 2.80 g/cm³ and 1.40 g/cm³ respectively, and the positive and negative electrodes were cut out to prepare electrode assemblies so that the cell capacity was 6.6 Ah, and 56.76 g of the non-aqueous electrolyte solution was injected.

Comparative Example 6

A non-aqueous electrolyte secondary cell according to Comparative Example 6 was fabricated in the similar manner to the above Comparative Example 5 except that 59.40 g of the non-aqueous electrolyte solution was injected.
[Determination of the Initial Capacity]

The cells according to Examples 1 to 3 and Comparative Examples 1 to 6, which were prepared as described above, were charged at 1 It (5.4 A for Examples 1 to 3 and Comparative Example 1; 4.6 A for Comparative Examples 2 to 4; and 6.6 A for Comparative Examples 5 and 6) to a voltage of 4.1 V, and then charged at the constant voltage of 4.1V for 2.5 hours. Thereafter, the cells were discharged at 1 It (5.4 A for Examples 1 to 3 and Comparative Example 1; 4.6 A for Comparative Examples 2 to 4; and 6.6 A for Comparative Examples 5 and 6) to a voltage of 2.5 V, and their discharge capacities were measured. The results are shown in Table 1 below. The above charges and discharges were all performed at 25° C., and the values of 1 It were calculated from each cell capacity.

after the pulse cycle were discharged under the same condition as the above initial capacity determination, and their discharge capacities were measured. And a capacity retention rate after the cycle was calculated from the following equation. The results are shown in Table 1 below.

Capacity retention rate (%)=Discharge capacity after the cycle÷Initial capacity×100

[Calculation of the Volume of the Non-Aqueous Electrolyte Solution per Void Volume of the Outer Can]

First, the volume of the sealed space formed by the outer can and the sealing plate was calculated, and the void volume of the outer can was calculated by subtracting a substantial volume (a volume excluding the void volume) of the electrode assembly, which was calculated by mass and specific mass of materials constituting the electrode assembly, from the above-described volume of the sealed space. Next, the volume of the injected non-aqueous electrolyte solution was divided by the void volume of the outer can in order to calculate a volume of the non-aqueous electrolyte solution per void volume of the outer can. The above volumes were all calculated on the basis of 25° C. and 1 atm (101325 Pa).
[Calculation of the Mass of the Non-Aqueous Electrolyte Solution Per Cell Capacity]

The mass of the non-aqueous electrolyte solution was divided by the above-described initial capacity (cell capacity) in order to calculate a mass of the non-aqueous electrolyte solution per cell capacity.

TABLE 1

| | Mass of Non-aqueous electrolyte solution per Cell capacity (g/Ah) | Volume of Non-aqueous electrolyte solution per Void volume of Outer can (%) | Initial capacity (Ah) | Capacity retention rate after Pulse cycle (%) | | |
|---|---|---|---|---|---|---|
| | | | | Low Temp. | R.T. | High Temp. |
| Ex. 1 | 10.2 | 70.8 | 5.4 | 92.0 | 91.3 | 82.8 |
| Ex. 2 | 10.9 | 76.0 | 5.4 | 94.4 | 90.7 | 82.0 |
| Ex. 3 | 11.7 | 81.3 | 5.4 | 96.7 | 90.9 | 82.2 |
| C.E. 1 | 9.4 | 65.6 | 5.4 | 82.5 | 91.4 | 82.4 |
| C.E. 2 | 10.2 | 55.5 | 4.6 | 47.7 | — | — |
| C.E. 3 | 10.9 | 59.3 | 4.6 | 40.4 | — | — |
| C.E. 4 | 11.6 | 63.0 | 4.6 | 52.6 | — | — |
| C.E. 5 | 8.6 | 72.0 | 6.6 | 86.4 | — | — |
| C.E. 6 | 9.0 | 76.1 | 6.6 | 89.2 | — | — |

Ex. = Example
C.E. = Comparative Example
R.T. = Room temperature

[Pulse Cycle Test]

For the cells according to Examples 1 to 3 and Comparative Examples 1 to 6, which were prepared as described above, pulse charge/discharge was performed in which 270 A or less of electric current was charged and discharged within 60 seconds at a low temperature (−30° C.) until the total charge and discharge capacity was made up to 50 Ah or more. In addition, for the cell according to Examples 1 to 3 and Comparative Example 1, further pulse charge/discharge was performed in which 270 A or less of electric current was charged and discharged within 60 seconds at a room temperature (25° C.) and a high temperature (70° C.) until the total charge and discharge capacity was made up to 5000 Ah or more.

In the tests at the low temperature, the eventual conditions of Examples 1 to 3 and Comparative Examples 1 to 6 were all the same. And in the tests at the room temperature and high temperature, the eventual conditions of Examples 1 to 3 and Comparative Example 1 were all the same. Then, the cells In the above Table 1, Comparative Example 1, in which the mass of the non-aqueous electrolyte solution per cell capacity is 9.4 g/Ah and the volume of the non-aqueous electrolyte solution per void volume of the outer can is 65.6%, shows that the capacity retention rate after the pulse cycle is 82.5% (low temperature), 91.4% (room temperature) and 82.4% (high temperature). Meanwhile, Examples 1 to 3, in which each mass of the non-aqueous electrolyte solution per cell capacity is 10 g/Ah or more and each volume of the non-aqueous electrolyte solution per void volume of the outer can is 70% or more, show that capacity retention rates after the pulse cycle is 92.0 to 96.7% (low temperature), 90.7 to 91.3% (room temperature) and 82.0 to 82.8% (high temperature). Therefore, the cell according to Comparative Example 1 is markedly inferior under the low temperature condition compared with the cells according to Examples 1 to 3.

Moreover, Comparative Examples 2 to 4, in which each mass of the non-aqueous electrolyte solution per cell capacity is 10.0 g/Ah or more but each volume of the non-aqueous electrolyte solution per void volume of the outer can is less than 70% (55.5 to 63.0%), show that the capacity retention rates after the pulse cycle are 40.4 to 52.6% at the low temperature. And Comparative Examples 5 and 6, in which each mass of the non-aqueous electrolyte solution per cell capacity is less than 10.0 g/Ah (8.6 to 9.0 g/Ah) and each volume of the non-aqueous electrolyte solution per void volume of the outer can is 70% or more, show that are 86.4 to 89.2% at the low temperature. Meanwhile, Examples 1 to 3, in which each mass of the non-aqueous electrolyte solution per cell capacity is 10.0 g/Ah or more and each volume of the non-aqueous electrolyte solution per void volume of the outer can is 70% or more, exhibit 92.0 to 96.7% of the capacity retention rates at the low temperature. Therefore, it is found that the cells according to Comparative Examples 2 to 6 are inferior in the capacity retention rates after pulse cycle at the low temperature compared with the cells according to Examples 1 to 3.

A possible explanation for this is as follows. The positive electrode using a lithium transition metal composite oxide and the negative electrode using carbon material swell and contract due to charge/discharge. The non-aqueous electrolyte solution moves to the outside of the electrode plate at the time of the swelling, and to the inside of the electrode plate at the time of the contraction. In this case, when the volume of the non-aqueous electrolyte solution per void volume in the outer can is too small, since a sufficient amount of the non-aqueous electrolyte solution is not supplied at the time of the contraction during repeated charge and discharge cycles, shortage of the non-aqueous electrolyte solution occurs and thereby smooth charge/discharge reaction is prevented. Especially at a low temperature, since viscosity of the non-aqueous electrolyte solution increases, shortage of the non-aqueous electrolyte solution is more likely to occur, and thereby discharge capacity subsequently decreases at room temperature. Moreover, when the mass of the non-aqueous electrolyte solution per cell capacity is too small, since the absolute amount of the non-aqueous electrolyte solution is small, there easily occurs shortage of the non-aqueous electrolyte solution involved in the charge/discharge cycles.

In order to improve the capacity retention rate after the pulse cycle at a low temperature, it is required that the mass of the non-aqueous electrolyte solution per cell capacity is 10.0 g/Ah or more, and further that the volume of the non-aqueous electrolyte solution per void volume in the outer can is 70% or more. If at least one of the above requirements is not met, it is not possible to improve the capacity retention rate after the pulse cycle at a low temperature. For the above reasons, the mass of the non-aqueous electrolyte solution per cell capacity is set to 10.0 g/Ah or more, and the volume of the non-aqueous electrolyte solution per void volume in the outer can is set to 70% or more.

On the other hand, when the volume of the non-aqueous electrolyte solution per void volume in the outer can is 85% or more, since a longer time is required for injection of the non-aqueous electrolyte solution, the production efficiency is reduced. In addition, when the mass of the non-aqueous electrolyte solution per cell capacity is around 12 g/Ah, the effect of improving cycle characteristics at a low temperature almost reaches the maximum. In this situation, if the mass of the non-aqueous electrolyte solution increases to more than the above value, weight energy density decreases. Therefore, it is preferable that the volume of the non-aqueous electrolyte solution per void volume in the outer can is limited to 85% or less, and that the mass of the non-aqueous electrolyte solution per cell capacity is limited to 12 g/Ah or less.

(Supplementary Remarks)

As the positive electrode active material, the following lithium transition metal composite oxides can be used: lithium cobalt oxide ($LiCoO_2$); lithium nickel oxide ($LiNiO_2$); lithium manganese oxide ($LiMn_2O_4$); and composite oxides such as lithium nickel manganese composite oxide ($LiNi_{1-x}Mn_xO_2$ ($0<x<1$)), lithium nickel cobalt composite oxide ($LiNi_{1-x}Co_xO_2$ ($0<x<1$), lithium nickel cobalt manganese composite oxides ($LiNi_xCo_yMn_zO_2$ ($0<x<1$, $0<y<1$, $0<z<1$, $x+y+z=1$). In addition, hetero elements such as Al, Ti, Zr, Nb, B, Mg and Mo may be added to the lithium transition metal composite oxide under the condition in which the ratio of the total mole number of the hetero elements is 0.02 or less relative to the total mole number of Co, Ni and Mn.

As the negative electrode active material, there can be used natural graphite, artificial graphite, non-graphitizable carbon, graphitizable carbon, fibrous carbon, coke, carbon black and the like.

As the separator, a porous membrane made of olefin resin such as polyethylene and polypropylene can be used. The porous membrane may have a single-layer structure or a multilayer structure.

The filling density of the positive electrode is preferably 2.0 to 2.9 g/cm$^3$, more preferably 2.2 to 2.8 g/cm$^3$, and still more preferably 2.4 to 2.8 g/cm$^3$. The filling density of the negative electrode is preferably 0.9 to 1.5 g/cm$^3$.

As a solvent in the non-aqueous electrolyte solution, the following compounds can be used alone or in mixture of two or more kinds: cyclic carbonates such as ethylene carbonate, propylene carbonate, butylene carbonate, vinylene carbonate and fluoroethylene carbonate; lactones such as γ-butyrolactone and γ-valerolactone; linear carbonates such as diethyl carbonate, dimethyl carbonate and methyl ethyl carbonate; ethers such as tetrahydrofuran, 1,2-dimethoxy ethane, diethylene glycol, dimethyl ether 1,3-dioxolane, 2-methoxy tetrahydrofuran and diethyl ether; and esters such as ethyl acetate and propyl acetate.

As an electrolyte salt in the non-aqueous electrolyte solution, the following compounds can be used alone or in mixture of two or more kinds: $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)LiC(C_2F_5SO_2)_3$, $LiAsF_6$, $LiClO_4$, $Li_2B_{10}Cl_{10}$, $Li_2B_{12}C_{12}$, $LiB(C_2O_4)_2$, $LiB(C_2O_4)F_2$, $LiP(C_2O_4)_2F_2$. The concentration of the electrolyte salt is preferably 0.5 to 2.0 M (mol/l).

In addition, the non-aqueous electrolyte solution may contain other known additives such as vinylene carbonate, vinyl ethylene carbonate, cyclohexyl benzene and tert-amyl benzene.

In the above embodiment, the use of an outer can as a outer body is exemplified, but the invention is not intended to be limited to this, and it is also possible to use a laminated outer body and the like.

As explained above, the present invention realizes a non-aqueous electrolyte secondary cell having excellent cycle characteristics over a wide temperature range. Thus, the industrial applicability is significant.

What is claimed is:

1. A non-aqueous electrolyte secondary cell comprising:
 a positive electrode having a positive electrode active material composed of a lithium transition metal composite oxide;
 a negative electrode having a negative electrode active material composed of carbon material;
 a non-aqueous electrolyte solution; and
 an outer body in which the positive electrode, the negative electrode and the non-aqueous electrolyte solution are housed, wherein,
the mass of the non-aqueous electrolyte solution per cell capacity of the non-aqueous electrolyte secondary cell is 10.0 to 12.0 g/Ah, and
the volume of the non-aqueous electrolyte solution per void volume in the outer body is 70 to 85%.

2. The non-aqueous electrolyte secondary cell according to claim 1, wherein
a protective layer composed of an inorganic oxide and an insulative binder is respectively formed on at least one surface of the positive and negative electrodes, and
the inorganic oxide is at least one selected from the group consisting of alumina, titania and zirconia.

3. The non-aqueous electrolyte secondary cell according to claim 1 further comprising:
a prismatic outer can; and
a separator,
wherein,
the prismatic outer can houses:
the non-aqueous electrolyte solution; and
a flat electrode assembly in which the positive and negative electrodes and the separator are wound.

4. The non-aqueous electrolyte secondary cell according to claim 2 further comprising:
a prismatic outer can; and
a separator,
wherein,
the prismatic outer can houses:
the non-aqueous electrolyte solution; and
a flat electrode assembly in which the positive and negative electrodes and the separator are wound.

* * * * *